US008949360B1

(12) United States Patent
Jackson et al.

(10) Patent No.: US 8,949,360 B1
(45) Date of Patent: Feb. 3, 2015

(54) REQUEST AND RESPONSE AGGREGATION SYSTEM AND METHOD WITH REQUEST RELAY

(71) Applicant: crWOWd Inc., Santa Monica, CA (US)

(72) Inventors: Kwame Addae Jackson, Santa Monica, CA (US); Dylan Christopher Brown, Santa Monica, CA (US)

(73) Assignee: crWOWd, Inc., Santa Monica, CA (US)

( * ) Notice: Subject to any disclaimer, the term of this patent is extended or adjusted under 35 U.S.C. 154(b) by 0 days.

(21) Appl. No.: 14/143,228

(22) Filed: Dec. 30, 2013

(51) Int. Cl.
*G06F 15/16* (2006.01)
*H04L 12/58* (2006.01)

(52) U.S. Cl.
CPC ..................................... *H04L 51/04* (2013.01)
USPC ........................................................ 709/206

(58) Field of Classification Search
CPC ...... G06Q 10/107; H04L 51/12; H04L 51/16; H04L 51/18; H04L 63/10; H04L 51/06; H04L 51/32; H04L 51/14
USPC .......... 709/204–206; 715/751; 705/34, 14.66; 434/362
See application file for complete search history.

(56) References Cited

U.S. PATENT DOCUMENTS

| | | | |
|---|---|---|---|
| 7,107,311 B1 | 9/2006 | Zittrain | |
| 7,379,704 B2 | 5/2008 | Parker | |
| 8,250,139 B2 | 8/2012 | Ahuja | |
| 8,392,270 B2 | 3/2013 | Ho | |
| 8,392,271 B2 | 3/2013 | Ho | |
| 8,515,888 B2 | 8/2013 | Ventilla | |
| 8,516,379 B2 | 8/2013 | D'Angelo | |
| 8,522,152 B2 | 8/2013 | Baldwin | |
| 2005/0033813 A1* | 2/2005 | Bhogal et al. ................. | 709/206 |
| 2006/0242014 A1 | 10/2006 | Marshall | |
| 2007/0288577 A1* | 12/2007 | Kronlund et al. ............. | 709/206 |
| 2008/0160490 A1 | 7/2008 | Gomez | |
| 2008/0274444 A1 | 11/2008 | Saliba | |
| 2008/0307320 A1* | 12/2008 | Payne et al. ................... | 715/751 |
| 2010/0114702 A1 | 5/2010 | Wu | |
| 2011/0016030 A1* | 1/2011 | Goodermote et al. ......... | 705/34 |
| 2011/0106746 A1 | 5/2011 | Ventilla | |
| 2011/0264596 A1 | 10/2011 | Shifflett | |
| 2012/0101954 A1 | 4/2012 | Harris | |
| 2012/0158516 A1* | 6/2012 | Wooten et al. ............. | 705/14.66 |
| 2012/0246576 A1* | 9/2012 | Baldwin et al. ................ | 715/751 |
| 2012/0308983 A1* | 12/2012 | Obeid ........................... | 434/362 |
| 2013/0297692 A1* | 11/2013 | Raji et al. ...................... | 709/204 |

* cited by examiner

*Primary Examiner* — Jungwon Chang
(74) *Attorney, Agent, or Firm* — Courtney IP Law; Barbara B. Courtney

(57) ABSTRACT

A system and method for sending and receiving requests and responses, relaying requests, and aggregating requests and responses to and from social networks are described. In one aspect a system user can send a request to recipients chosen by the user as being people or groups most likely to have useful responses to the request. Recipients can respond to the request, relay the request to one or more additional recipients, or both. The other recipients can further respond to and/or relay the request, etc. The system user who originated the request (also referred to as the request originator, or the originator) has control over which other users, if any, can see the request. For example, the originator can specify that the request not be relayed.

27 Claims, 19 Drawing Sheets

18th Street Recreation Center   2 people recommended this.
S.O'Brien, T.Jackson General Information John Smith Where is a good place to play basketball in west Los Angeles?

Sam O'Brien

Check out the courts on 18th and Washington around 9 AM on Sundays. Good group of guys around your skill level.

18th Street Recreation Center    X

Wally, here's how you connect to Sam...

You

More Information

Shared Contacts

21 system users
10 email contacts
7 SN2 users

Sam

FIG. 19

REQUEST AND RESPONSE AGGREGATION SYSTEM AND METHOD WITH REQUEST RELAY

BACKGROUND

People increasingly expect to obtain answers to requests of all kinds quickly online. Search engines become ever more sophisticated, yet can only understand what a user typed, not what a user really wants to know. One type of request is a question that the user would like answered. For example, one may ask "where is a good place to play basketball?" A search engine will provide nearby court locations and/or previous write-ups about basketball from random strangers who happened to use the word "good." Whereas, a basketball playing friend would understand what "good" means to the asker (e.g. similarly skilled players, wood court, and like-minded professionals) and answer accordingly. Another type of request is for a referral. e.g., to a person or company that provides, or is looking for, a service. Users would like to receive answers and referrals from people who they view as being most likely to provide useful responses. Also, users would prefer to control how or whether recipients of the request can relay the request to other people. For instance, the one asking about basketball may want her request to be forwarded by her friends to other like-minded, knowledgeable people outside of her network. Or she may choose to limit that option such that the question cannot be forwarded. But that level of user control is not available in prior systems. Conventional request and response systems, such as Q&A and crowd funding sites, allow users to send requests to strangers via a public forum. However, people typically trust responses from people they know over responses from strangers. Some existing systems allow users to send requests to their social network; however, the best people to respond are often outside of the user's social network. Other conventional systems that focus on mapping relationships between people do not provide a facility for a user to make requests of specific people known to the user, while allowing the user to control how the request and any responses are distributed within a system. In addition, there is no such system that also aggregates requests and responses, and displays user relationships across internal and external networks. Further, there is no such system that parses aggregated requests and responses by external webpages that have been specifically referenced in responses, and allows those external web pages to display related requests, responses and responders' relationships to the viewer.

BRIEF DESCRIPTION OF THE DRAWINGS

FIG. 19 illustrates a screenshot of an external site displaying information from a request and response aggregation system according to an embodiment.

DETAILED DESCRIPTION

A system and method for sending and receiving requests and responses, relaying requests, and aggregating requests and responses to and from social networks are described. In one aspect a system user can send a request to recipients chosen by the user as being people or groups most likely to have useful responses to the request. Recipients can respond to the request, relay the request to one or more additional recipients, or both. The other recipients can further respond to and/or relay the request, etc. The system user who originated the request (also referred to as the request originator, or the originator) has control over which other users, if any, can see the request. For example, the originator can specify that the request not be relayed.

All responses are captured in the system and made available to the originator. In one embodiment, people relaying requests can add an optional message for the next recipient.

Requests can be sent and relayed to people within the system and outside of the system via various electronic communication platforms, including, but not limited to, text, email, posts on other networking sites, or social networking sites, etc. The system receives and interprets responses entered within its own platform as well as responses from platforms outside the system and associates responses with the original requests, thereby aggregating responses from different platforms in a single place. Requests can be of any type including, but not limited to, questions (including one or more of text, audio, and video), funding solicitations, job leads, dating recommendations, etc. Responses can be of any type including, but not limited to, answers (including one or more of text, audio, and video), financial commitments, money transfers, etc.

In an embodiment a unique identifier is used to reference users within the system. Users within the system can be individuals or groups. This identifier routes requests to the referenced user or group.

Figure 1:
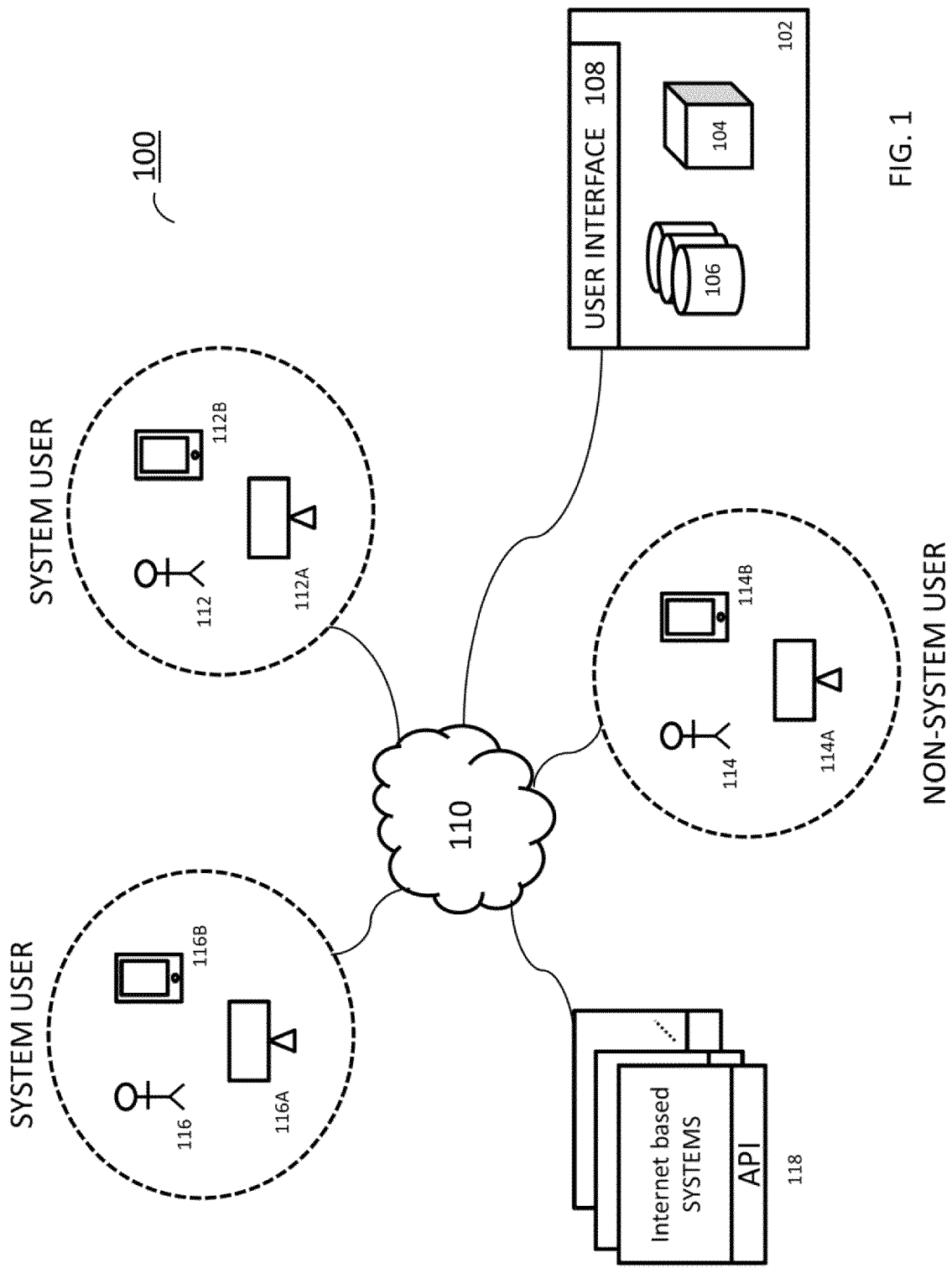
FIG. 1 is a block diagram of a request and response aggregation system according to an embodiment.

FIG. 1 is a block diagram of a request and response aggregation environment 100 according to an embodiment. The environment is characterized by electronic communications over one or more networks, such as the Internet 110, and sometimes wide area networks (WANS) and local area networks (LANS) in communication with the Internet 110. A system 102 is an example of a request and response relay and aggregation system. The system 102 includes databases 106 for storing user information and aggregated request and response data. As further described below, user information encompasses personal data that individual system users choose to submit to the system, as well as relationship data that describes relationship between users, and also between users and non-users, where "user" denotes a person who has signed up with the system or a group that has been created in the system by a user. The databases 106 shown in the figure can also be distributed in multiple physical locations, not just within a location of system 102. In fact any of the elements of system 102 can be geographically distributed in the known manner across any network capable of communicating the amounts and types of data transferred according to embodiments of the methods described herein.

Processors 104 are part of system 102 and include data processing elements for performing the methods described herein. A user interface 108 is executed by processors 104 to present system users with a way to interact with the system as shown and described herein.

Various entities are shown in FIG. 1. They include a system user 116, another system user 112, and a non-system user 114. The system users 116 and 112 have signed up with the system and access the facilities of the system through the user interface 108. Non-system user 114 is not yet a system user, but potentially has relationships and connections to one or more of the system users. System users and non-system users may know each other personally and/or be connected as friends or colleagues in one or more online networks such as, without limitation, Facebook™ and LinkedIn™. System users can also be related to non-system users when non-system users are listed as contacts in a system user's email contact list(s), e.g. a system user's Google Gmail™ contact list.

System user 116 is shown with a computer 116A and a mobile phone 116B as examples of devices useable to access the user interface 108. Any other devices not shown here that can access the Internet 110 are equally capable of providing access to the user interface 108 of the system 102. Similarly, system user 112 is shown with a computer 112A and a mobile phone 112B, and the non-system user 114 is shown with a computer 114A and a mobile phone 114B.

Many web-based (Internet-based) systems 118 can be accessed directly by users 116, 112, and 114. These web-based systems 118 include many systems with application programming interfaces (APIs) that facilitate actions performed by the system 102. For example, Facebook™ is a system 118 that may make APIs available to system 102 so that system 102, with user approval, can access the user's lists of "friends".

Figure 2:
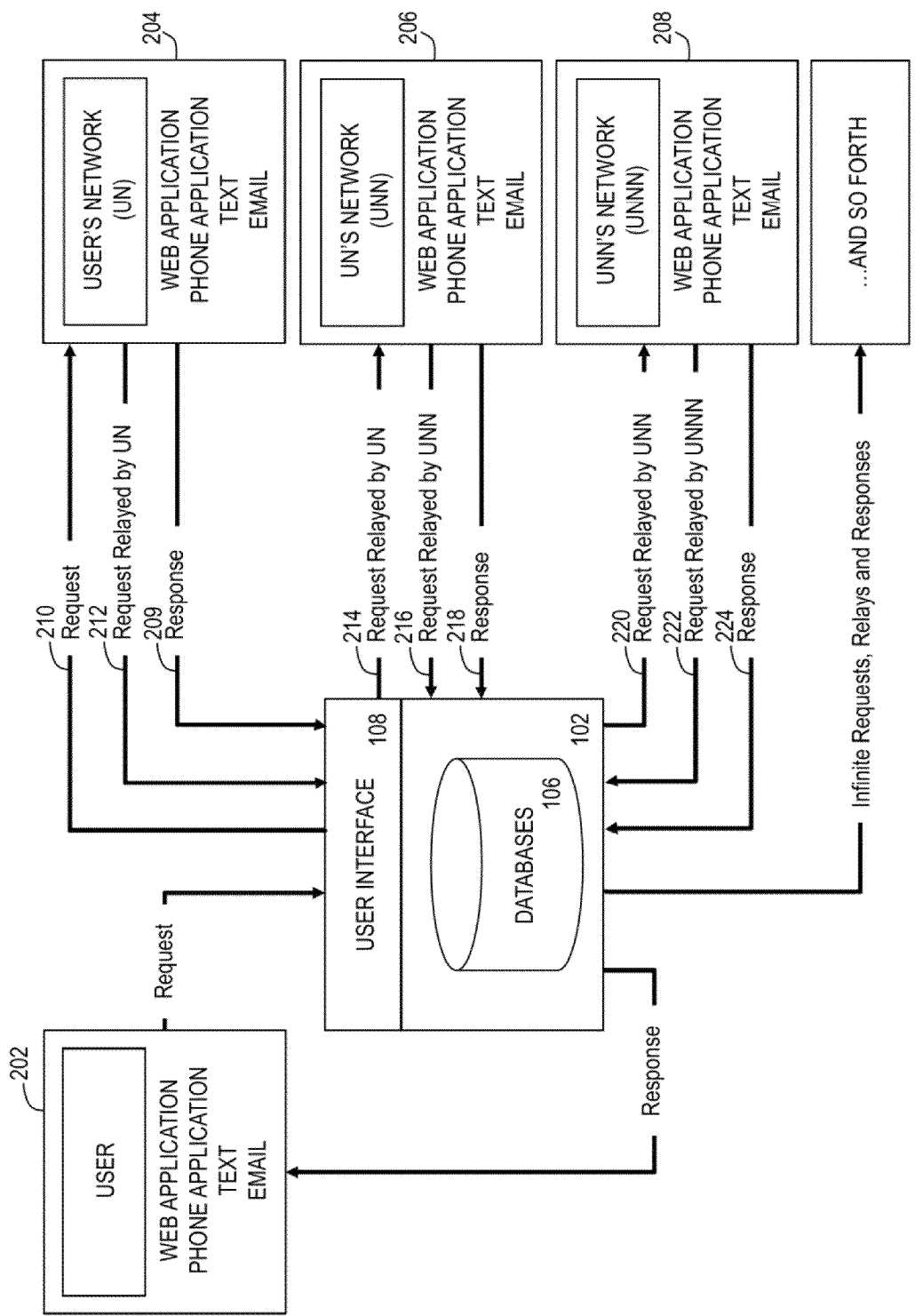
FIG. 2 is a block diagram of a request and response aggregation system according to an embodiment.
Figure 3:
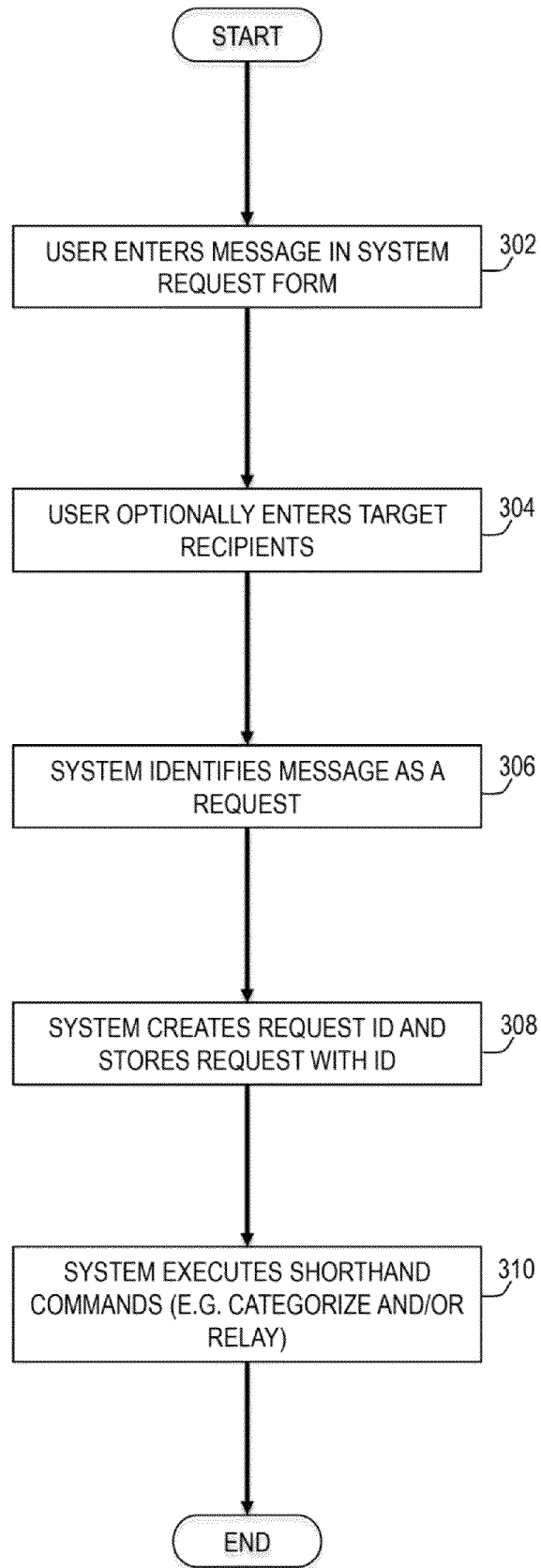
FIG. 3 is a flow diagram of an aspect of a request and response aggregation method according to an embodiment.

FIG. 2 is a block diagram of a request and response aggregation environment according to an embodiment. FIG. 2 illustrates how the system 102 aggregates requests and responses. A system user 202 originates a request with a web software application (web application), a phone application, a text message or an email message as non-limiting examples. In an embodiment, the web applications are aspects of the user interface 108 presented to the system user 202 through the particular device being used. The system user 202 is also referred to herein as the request originator, or the originator. The request can be a question to be answered, a request for funds or any other appeal for input that a person might wish to address to someone they trust to appropriately respond to and/or relay.

The system 102 receives the request made by the originator 202 and stores it in the databases 106. The system 102 also transmits the request (210) to user's network (UN) 204 (referred to for convenience as UN 204). UN 204 is one or more networks of the originator 202, as previously described to include fellow system users and fellow members of other networks (e.g., social networks and email application contact lists). As described further below, the request is transmitted (210) to particular members of UN 204 that have been identified by system user 202 (the originator) as recipients of the request.

Each of the recipient users of UN 204 receive the request via one or more of their own web applications, phone application, text messages or email messages. When one of recipient users of UN 204 responds to the request (209), it is transferred to the system 102, which stores the response in the databases 106. In addition to responding, or instead of responding, the user 204 can also relay the request provided that the originator permitted relaying. As used herein, to relay means to indicate further recipients of the request to whom the relayer wishes to pass the request. When a request is relayed (212) it is transferred from the UN 204 to the system 102. The system 102 stores relay data in the databases 106, such as the request being relayed or a pointer to the request, the identity of the user initiating the relay, the user(s) to whom the request is to be relayed, and relationships among all of the involved users. The system 102 relays the request according to the relay information (e.g., identities of the relay recipients) provided by the user of UN 204. The system 102 cannot perform a relay if the originator 202 indicated that the request is not to be relayed.

The relay recipients are members of UN 204's network(s) (UNN) 206 (referred to for convenience as UNN 206). UNN 206 is one or more networks of the UN 204, as previously described to include fellow system users and fellow members of other networks (e.g., social networks and email application contact lists). Each of the UNN 206 users can choose to respond to the request (218), relay the request (216), or both. The system 102 receives any responses and relays, stores all of the data associated with the responses and relays, and transmits the responses and relays in a similar fashion to the actions performed by the system 102 on receiving input from the UN 204. In this instance, the relayed request (220) is transmitted to members of UNN 206's network(s) (UNNN) 208 (referred to for convenience as UNNN 208). UNNN 208 is one or more networks of the UNN 206, as previously described to include fellow system users and fellow members of other networks (e.g., social networks and email application contact lists). Members of UNNN 208 that are identified in the request relay 220 can respond to the request (224), or relay the request again (222), or both. The system 102 receive any responses and relays from UNNN 208 and store them along with any associates data, and aggregates all of the data associated with the originator's request from user 202. Requests may be relayed to potentially infinite recipients on an ongoing basis. System users through user interface 108 can easily refer to all aggregated data stored in the system database (106). Unlike existing networks which do not show the complete history of a post and its comments regardless of whether a user upstream of the originating post is a "friend" or common network member of the originator, the entire history of responses to a request is available, subject to the privacy settings set by the originator. Another aspect of an embodiment includes a maximum number of requests that can be sent to the system 102 by any one originator over a predetermined time period. Other similar limitations can also be imposed by the system 102.

Figure is flow diagram of an aspect of a user request process according to an embodiment. The user fills out a request form in the system 102 via the user interface 108 (see 302). Optionally, the user enters recipients to whom the system will route the request (304). The user submits the request form to the system 102, which recognizes the data in the message field as a request (306). The system 102 creates a request identification (ID) for the request and stores the request (308). The request ID is a unique identifier that allows all of the data associated with a request to be linked to that request. The system 102 then executes shorthand commands that the user may have included in the request (310). As further described with reference to drawings illustrating an embodiment of the user interface 108, the system provides icons that are clickable by the user and shorthand commands to indicate what the user wants the system to do, such as to send (relay) the request to particular recipients, categorize the request as belonging to a predefined category, etc.

Figure 4:
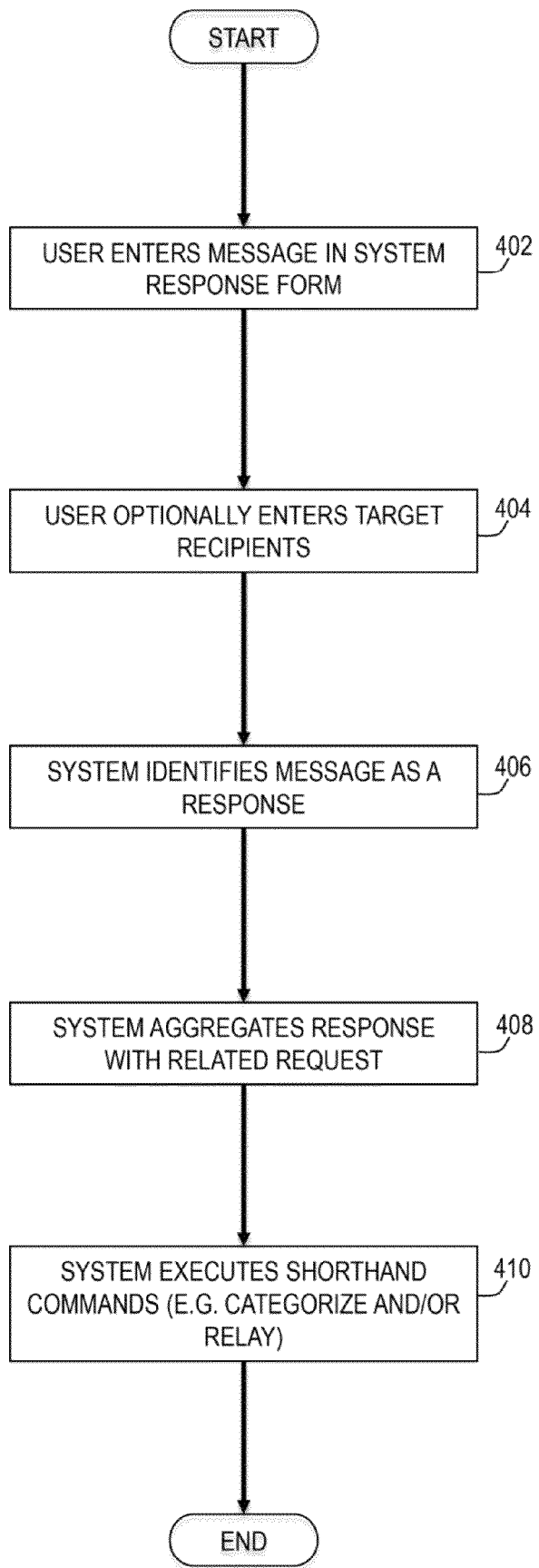
FIG. 4 is a flow diagram of an aspect of a request and response aggregation method according to an embodiment.

FIG. 4 is a flow diagram of a user response process according to an embodiment. The responding user has viewed a request (as further described below) and chooses to respond to the request and/or relay it. At 402, the user fills out a response form in the system 102 via the user interface 108. Optionally, the user enters recipients to whom the system will route the request (404). The user submits the response form to the system 102, which recognizes the data in the response field as a response (406). At 408, the system 102 aggregates the response with the related request using the request ID, which is present in all of the follow-on data transactions related to the original request. The system 102 then executes shorthand commands that the user may have included in the request field (410), such as to send (relay) the request to particular recipients, categorize the response as belonging to a predefined category, etc.

Figure 5:
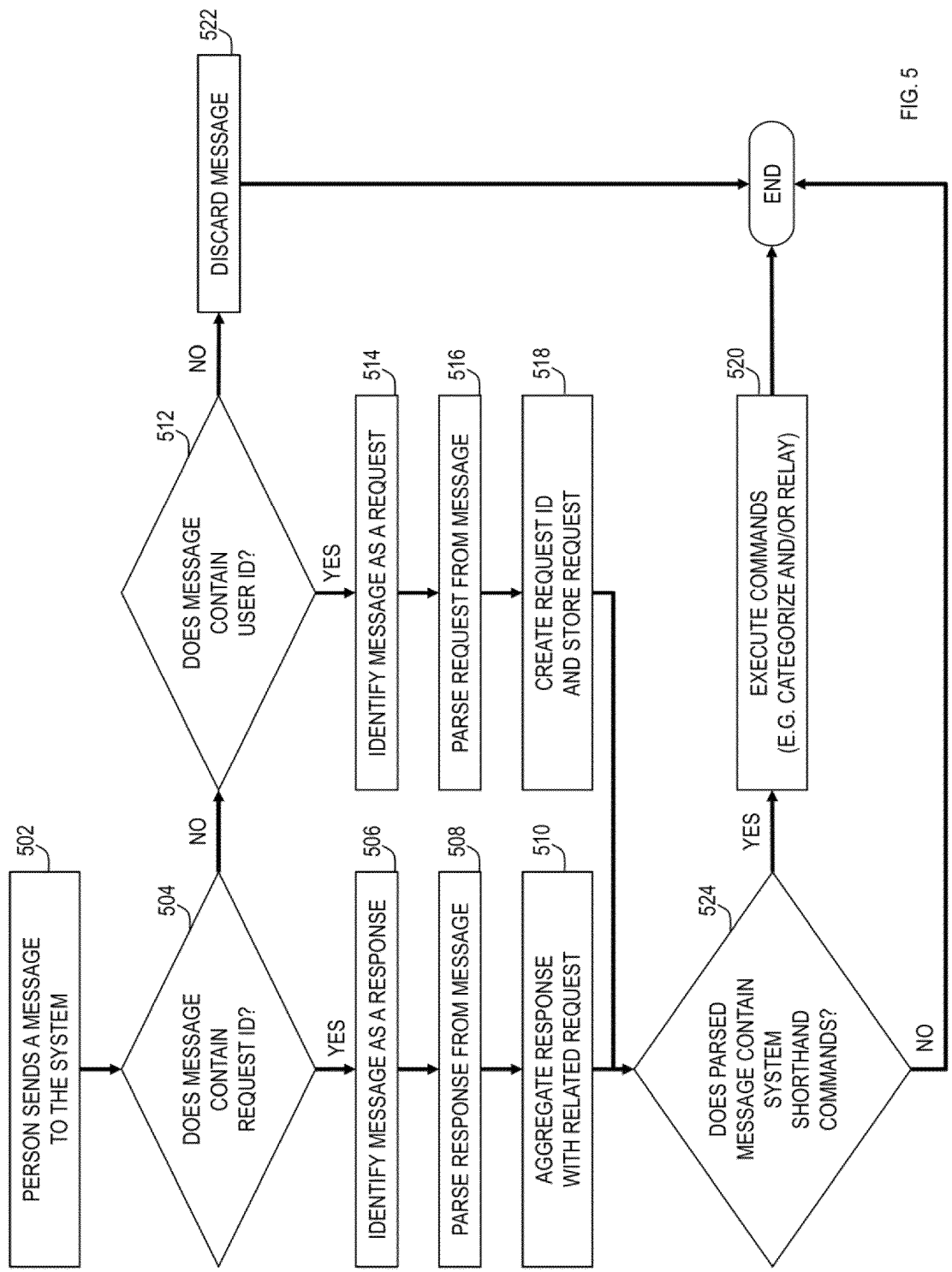
FIG. 5 is a flow diagram of an aspect of a request and response aggregation method according to an embodiment.

FIG. 5 is a flow diagram of a message receipt process performed by the system 102 according to an embodiment. At 502, a person sends a message to the system 102. The message could be any type of message allowed via the user interface 108. For example, the message could be a reply to a request received via email. At 504, the system determines whether the message contains a request ID. If the message does contain a request ID, the message is identified (506) as a response to an existing request. The system parses the response from the message (508) and aggregates the response with the request (510). The system also determines whether the parsed message contains system shortcut commands (524). If shortcut commands are present, the system executes the commands (such as categorizations, whether to allow relays, who to relay request to, etc.) at 520.

If the received message does not contain a request ID (504), the system determines whether the message contains a user ID in an acceptable format (512). A user ID is a unique identifier for an existing system user. If the message does not contain a user ID (or a request ID) the system discards the message (522). If the message contains a user ID, but no request ID, the system identifies the message as a request (514). The request is parsed from the message (516), the system creates a request ID, and stores the request and its ID (518). The system also determines whether the parsed message contains system shortcut commands (524). If shortcut commands are present, the system executes the commands (such as categorizations, who to send request to, etc.) at 520.

Figure 6:
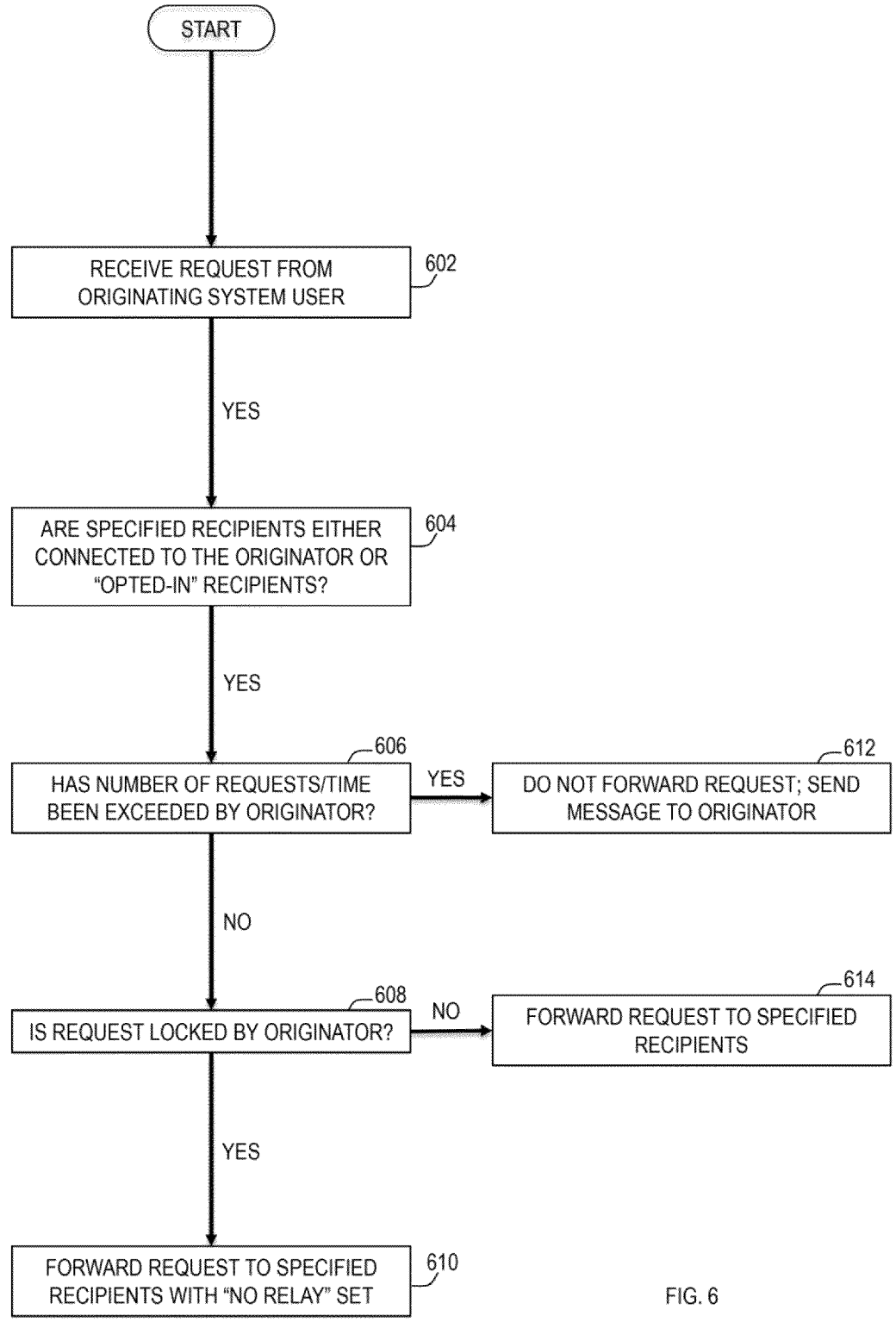
FIG. 6 is a flow diagram of an aspect of a request and response aggregation method according to an embodiment.

FIG. 6 is a flow diagram of a request receipt process performed by the system 102 according to an embodiment. At 602 the system receives a request from an originating system user. The system determines (604) whether the recipients specified by the originator are either connected to the user (originator) or are "opted-in" recipients. Opted-in recipients are system users who allow any other system user to send a request to them whether they are connected or not. Such recipients can choose the option of receiving requests from the originator even though they might not be explicitly connected. If none of the specified recipients are connected to the originator or opted-in recipients, the request is not forwarded, and a message is sent to the originator (612) informing them that they must specify qualified recipients.

If the specified recipients are either connected to the originator or are opted-in recipients, the system then determines whether a predetermined maximum number of requests per time period have been exceeded by the originator (606). In an embodiment, a predetermined number of requests are set for one originator during a time period. If the number of requests/time period has not been exceeded, the system determines (608) whether the originator has specified that the request cannot be relayed without originator approval (that is, whether the request is locked). If the request is not locked, the system forwards the request to the specified recipients (614). If the request is locked, the system forwards the request with a "no relay" (unless originator-approved) provision enabled (610).

If the number of requests/time period has been exceeded (606), the system does not forward the request, but sends a message to the originator to inform him or her that they must wait before sending another request (612).

Figure 7:
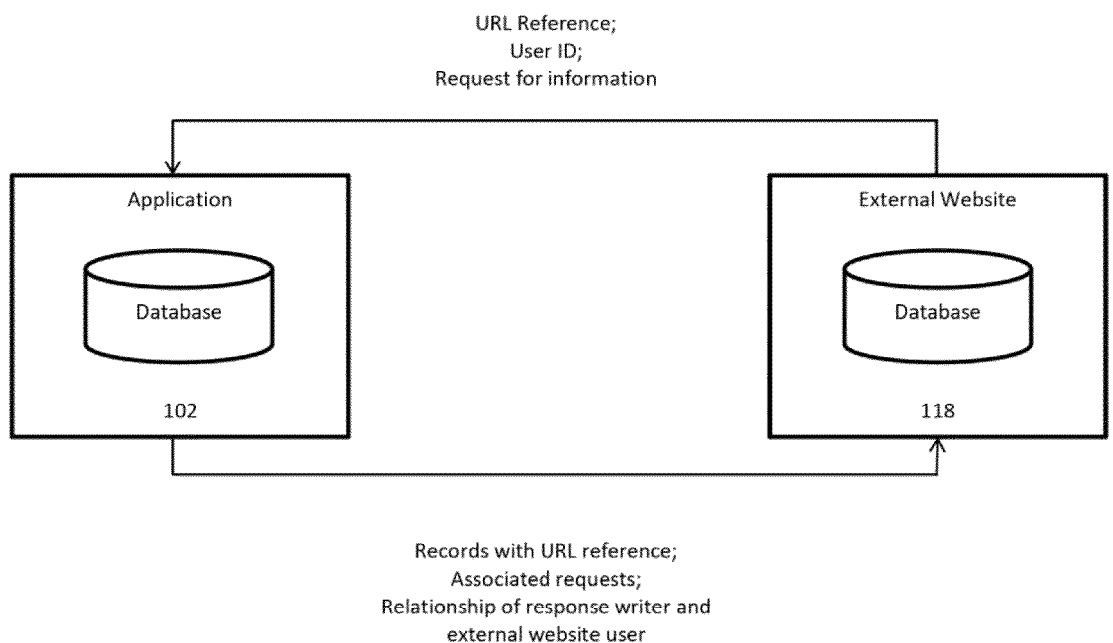
FIG. 7 is a block diagram of elements of a request and response aggregation system according to an embodiment.

FIG. 7 is a block diagram of the system 102 and an Internet-based system 118 (external website) according to an embodiment. A request for information is sent from the external website 118 along with a uniform resource locator (URL) and a system user ID to the system 102. The system 102 searches its own databases for records containing the URL. Records containing the URL are transmitted to the external website 118 with the URL reference, associated requests, and a description of the relationship between the record writers and the external website user.

Figure 8:
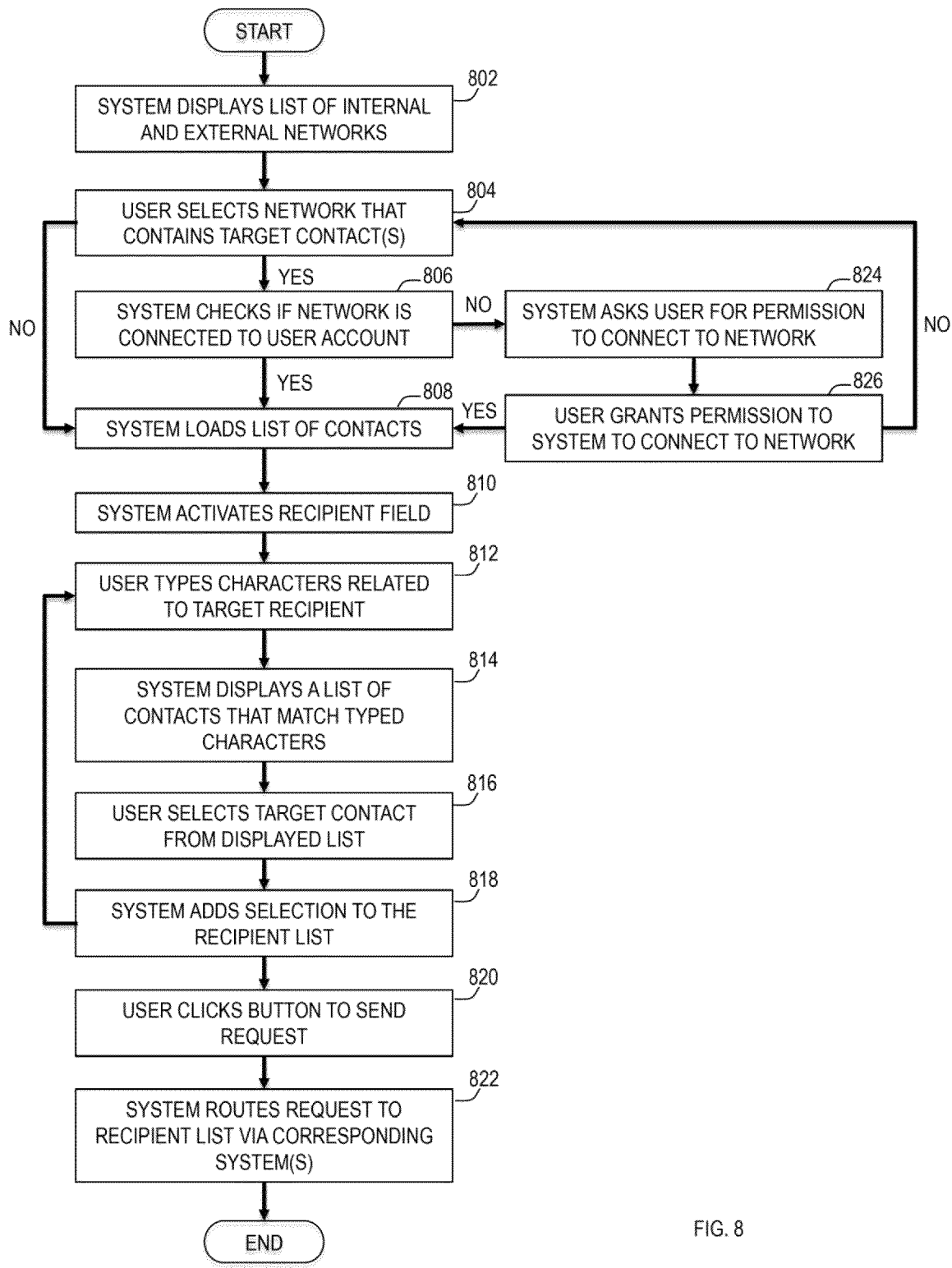
FIG. 8 is a flow diagram of an aspect of a request and response aggregation method according to an embodiment.

FIG. 8 is a flow diagram of a recipient selection process performed by the system 102 according to an embodiment. At 802, the system displays a list of internal and external networks. The user either selects a specific contact network (804) or allows the system to load contacts from all internal and external databases that are accessible to the user (808). If the user elects to narrow the query by selecting a specific contact network, the system checks to see if the network is already connected and accessible (806). If the network is connected to the user account, the system loads contacts from the database of the specified network that are accessible to the user (808). If the network is not connected to the user account, the system prompts the user to provide permissions and credentials to connect to the network (824). If the user does not grant permissions to the system to connect to the network (826), the user has the opportunity to select another network (804). If the user grants permissions to the system (826), the system loads contacts from the database of the specified network that are accessible to the user (808). The system activates the recipient field (810) within which the user types characters related to the target recipient (812). They system displays a list of contacts that match the characters typed by the user (814). From this list, the user selects the intended recipient (816), and the system adds the selected contact to the recipient list (818). Then, the user either types in a new contact (812) or clicks a button to send the request (820). The system routes the request to the recipient list via corresponding systems, which may be internal or external (822).

Figure 9:
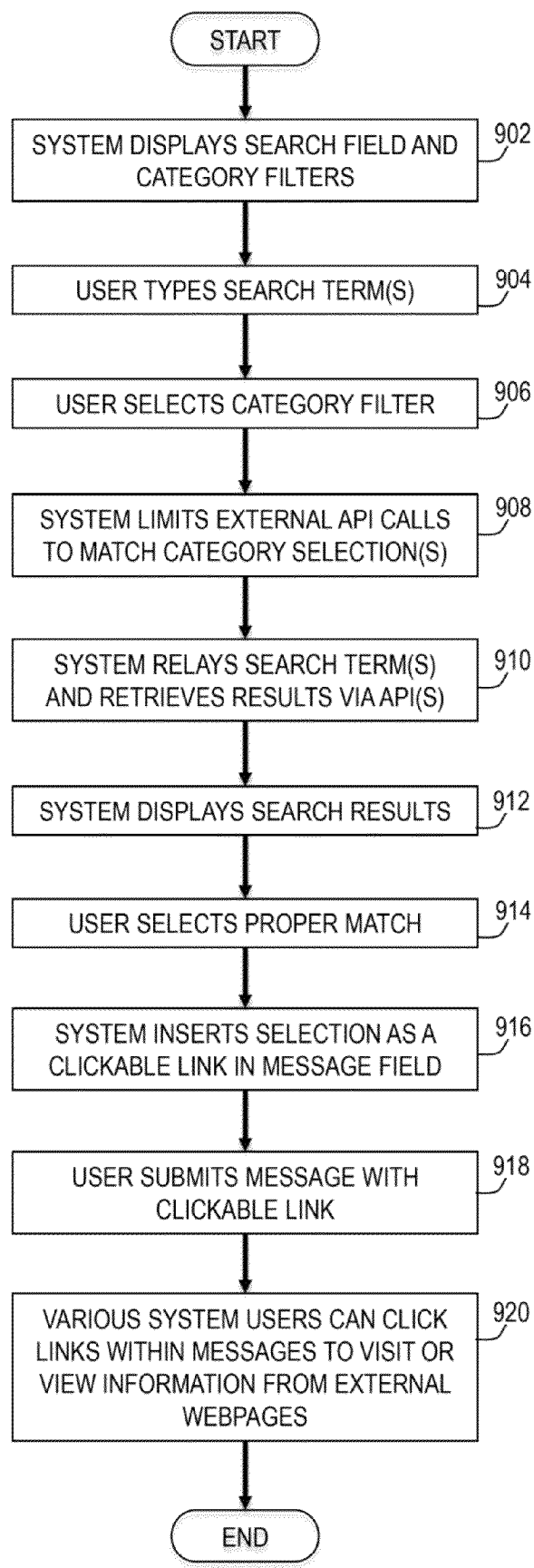
FIG. 9 is a flow diagram of an aspect of a request and response aggregation method according to an embodiment.

FIG. 9 is a flow diagram of an external link selection process performed by the system 102 according to an embodiment. The system displays a search field and category filters (902). The user types search term(s) in the search field (904), then selects a category filter to narrow the search or specify all categories (906). The system selects the external API(s) that match the category selection(s) (908). As the user types in the search field, the system relays search terms and retrieves results from external site(s) via their API(s) (910). The system displays the search results (912), from which the user can select (914) the closest match. The system adds the selected match as a clickable link within the message field—request or response (916). The user submits the message with the clickable link (918). Then users of the system can click on the links within messages to view external webpages (920).

Figure 10:
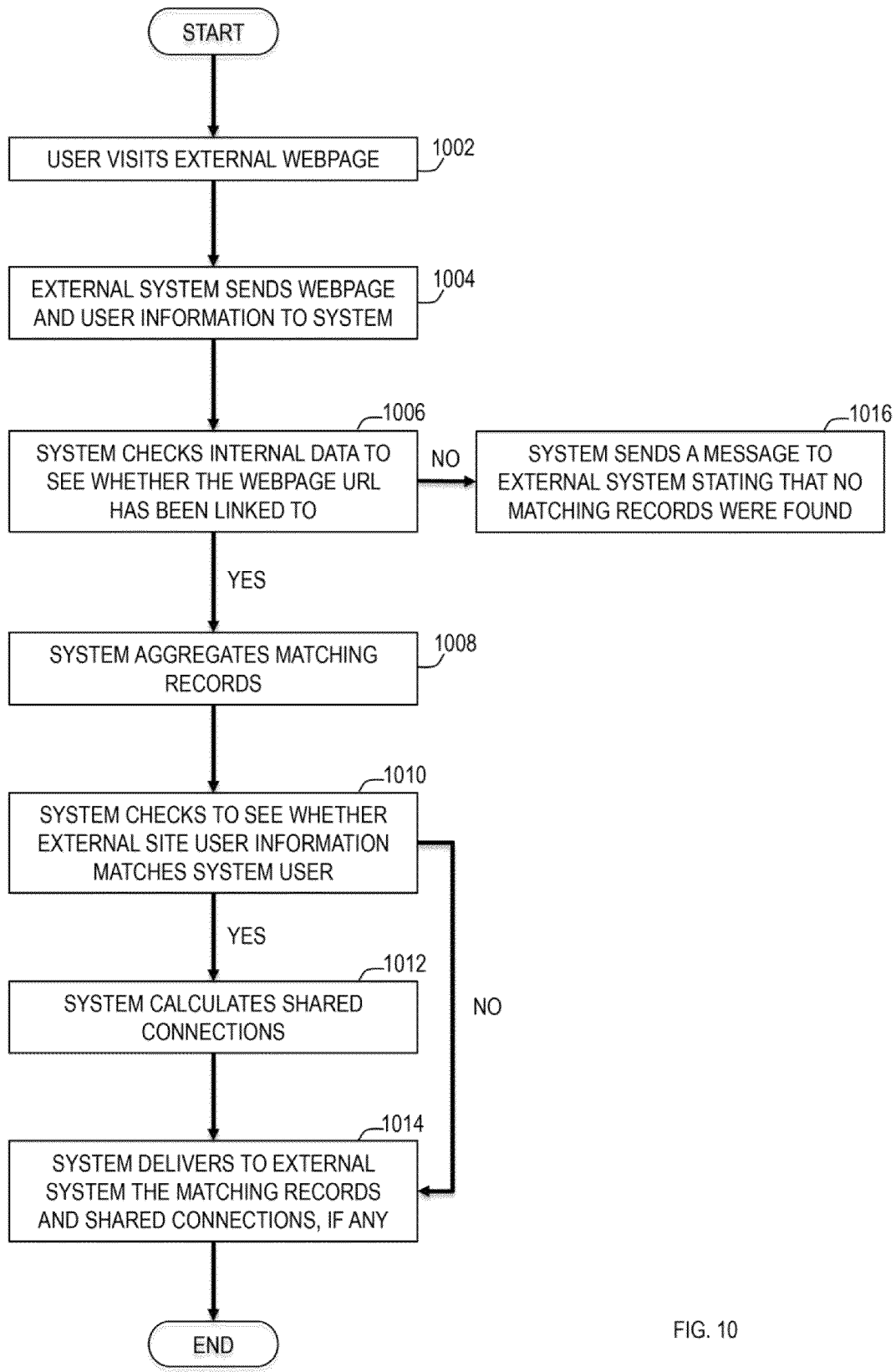
FIG. 10 is a flow diagram of an aspect of a request and response aggregation method according to an embodiment.

FIG. 10 is a flow diagram depicting the process of system 102 delivering request, response and relationship data to an external site according to an embodiment. A user visits an external webpage at 1002. Then the external webpage sends certain webpage and user information to system 102 (1004). System 102 then checks to see whether the webpage URL has been linked to in either request data or response data (1006). If not, system 102 sends a message to the external system stating that no matching records were found (1016). Otherwise, system 102 aggregates records that contain the webpage URL as well as corresponding messages (1008). Then, system 102 checks to see whether the user information sent by the external system includes an ID that matches a system 102 user (1010). If the webpage URL has been linked to in either request data or response data, the system calculates the number and type of shared connections between the user and other users of system 102 (1012). Then the system delivers to the external system the records sets that contain the external URL and shared connection data, if any, which can be displayed by the external system on the corresponding webpage (1014). If system 102 does not find a user ID to match the user information provided by the external system, then system 102 only delivers to the external system (1014) those records sets that contain the external URL.

Figure 11:
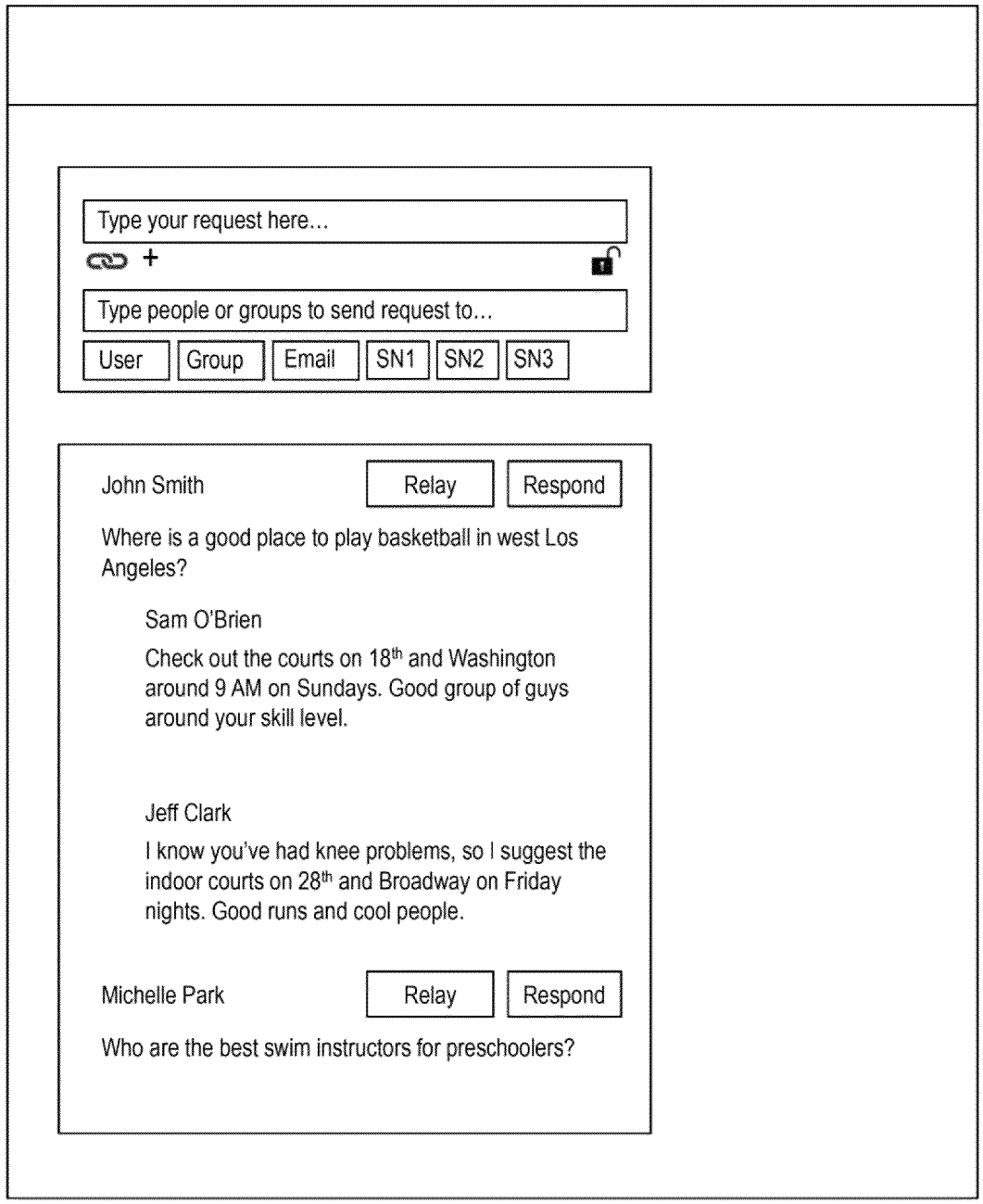
FIG. 11 is a wireframe of a user interface according to an embodiment.

FIGS. 11-18 are wireframe diagrams according to one embodiment of a user interface for the system 102. FIG. 11 is a user interface as displayed to a person who has logged into the system. In this example embodiment, the top component contains a field within which a person can type a request. Beneath the request field are icons to add a link to an external site, to add an attachment (e.g. a picture, PDF, voice message, video, etc.), and to lock the request (i.e. only allow the originator-approved recipients to see the request and corresponding replies on their respective message boards as well as disallow in-system request relays beyond the originator-approved recipients). Beneath those icons is a recipient field, where the user can type in people to send the request to. Upon field activation, the system connects with various internal and external contact lists (e.g. in-system users and groups as well as external social networking systems such as Facebook™ and LinkedIn™) and autosuggests contacts that match the characters typed by the user. Under the recipient field are buttons that a user can select to indicate a specific network of contacts for the purposes of narrowing the autosuggest options to a single network. Below the network buttons is a message board displaying groups of various request and response messages. Next to each request are two buttons allowing the user to relay the request or respond to the request.

Figure 12A:
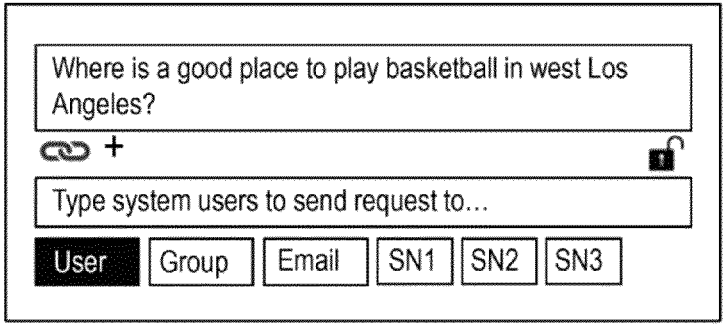
FIG. 12A through FIG. 12D are wireframes of a request user interface according to an embodiment.
Figure 12B:
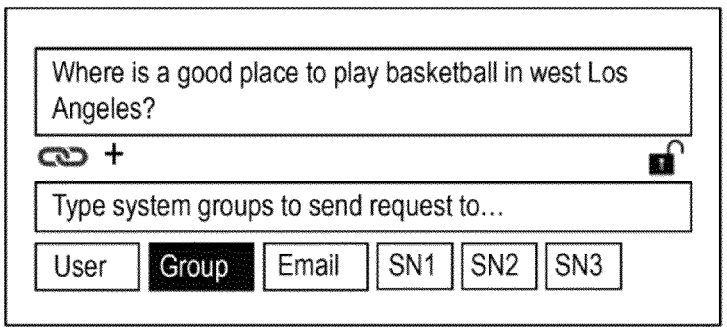
Figure 12C:
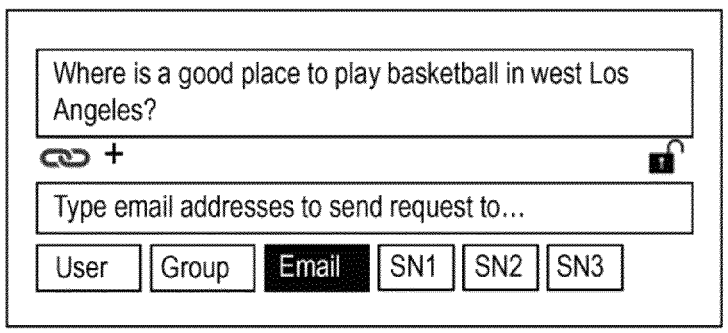
Figure 12D:
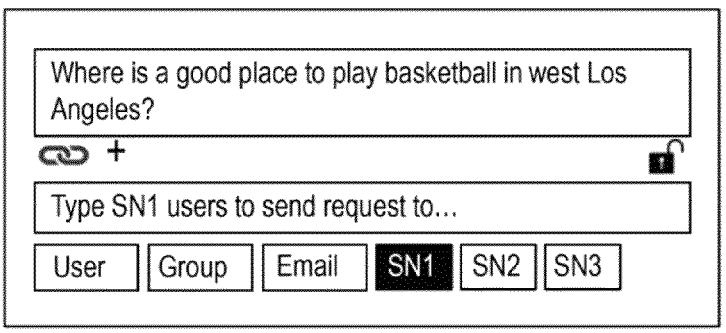

FIG. 12A through FIG. 12D are example embodiments of the request user interface, showing how the recipient field indicates the connection type after the user selects a network. FIG. 12A shows that the user has selected the in-system user network, and the system displays a message to "Type system users to send the request to . . . " FIG. 12B shows that the user has selected the in-system group network, and the system displays a message to "Type system groups to send the request to . . . " The next shows that the user has selected an external email network, and the system displays a message to "Type email addresses to send the request to . . . " FIG. 12C shows that the user has selected an external social network, and as shown in FIG. 12D the system displays a message to "Type SN1 users to send the request to . . . " In each case, as the user types, the system autosuggests contacts (as permitted) that match the characters typed into the field. The user can then select from the autosuggested options or complete the name/address manually.

Figure 13:
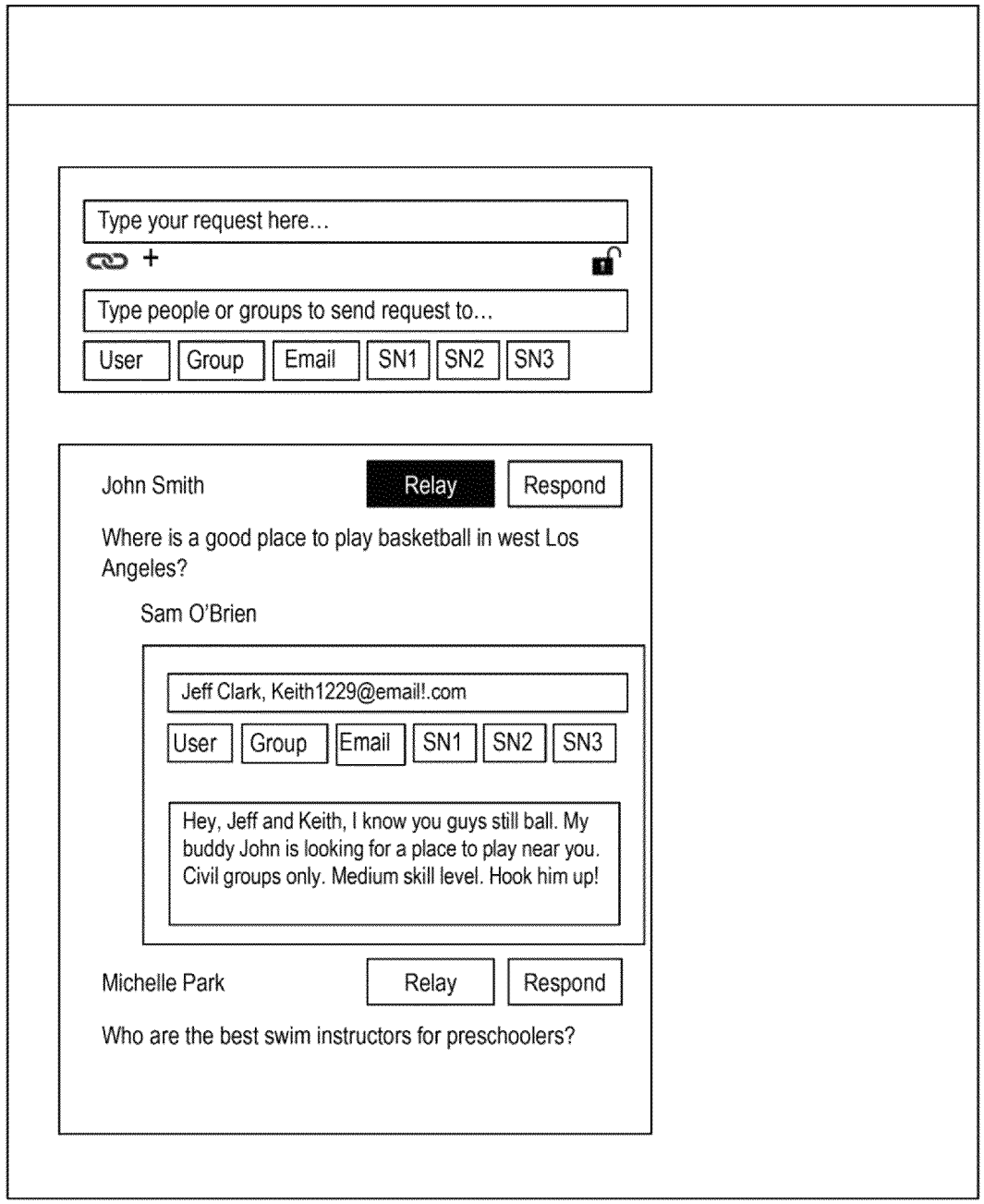
FIG. 13 through FIG. 18 are further wireframes of a user interface according to an embodiment.

FIG. 13 is a wireframe diagram of a user interface displayed to a person who has logged into the system and selected the option to relay a request. In this example embodiment, the user has viewed the request and decided to relay it to two contacts. One of the recipients is an in-system user and is shown in the recipient field by name. The other recipient is not a system user and is shown in the recipient field by email address. Below the recipient field and network buttons is a text box where the user can type in a message to be delivered to the recipients along with the invitation to respond to the original request.

Figure 14:
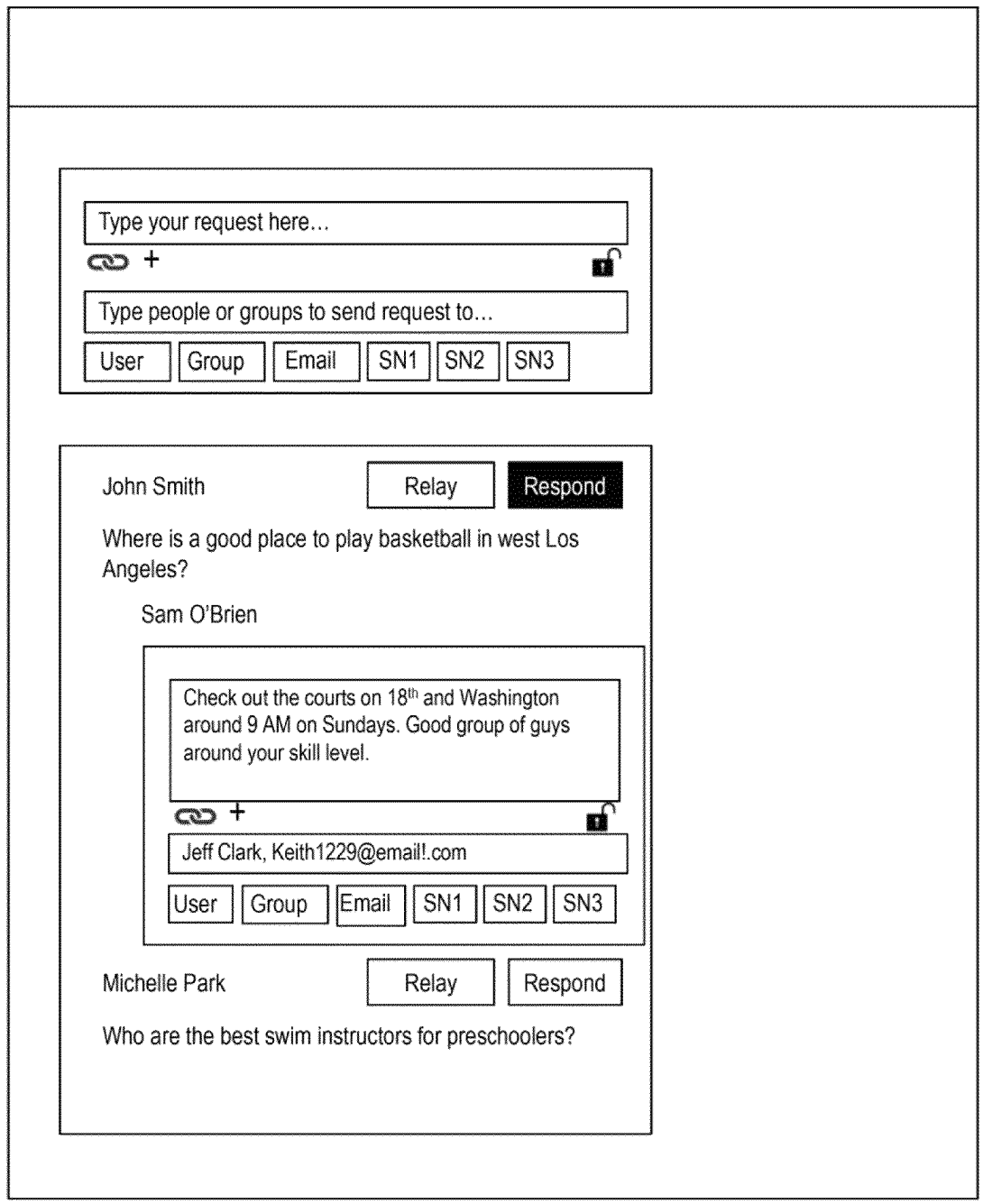

FIG. 14 is a wireframe diagram of a user interface displayed to a person who has logged into the system and selected the option to respond to a request. In this example embodiment, the user has viewed the request and decided to respond to it as well as relay it to two contacts. The user can type a response in the upper (response) field. Optionally, the user can click one of the icons below in order to add a link, attach a file and/or lock the answer (so that only the request originator can see the response). Additionally, the user can relay the request by entering recipients in the lower (recipient) field. In the example shown, one of the recipients is an in-system user and is shown in the recipient field by name. The other recipient is not a system user and is shown in the recipient field by email address.

Figure 15:
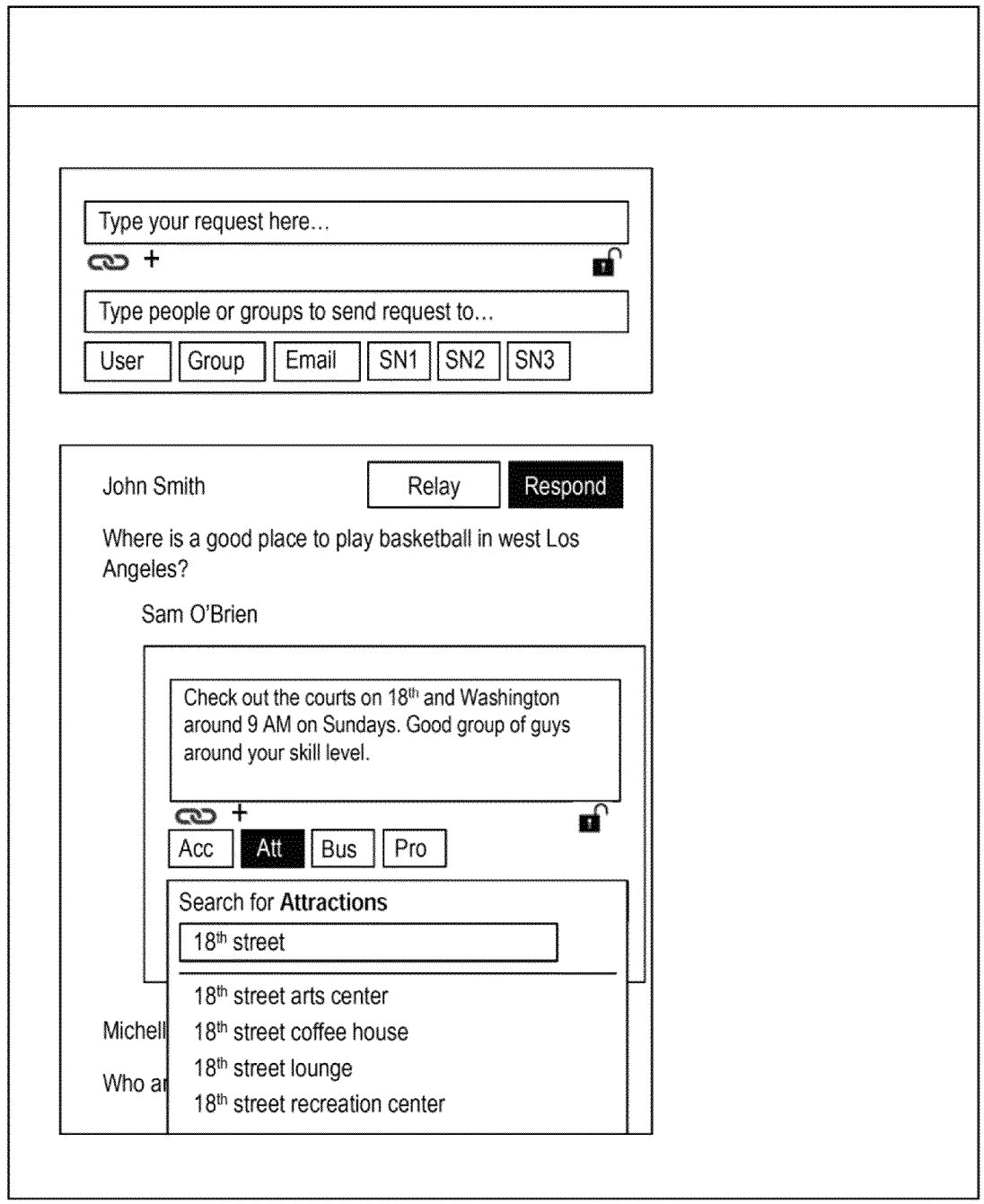

FIG. 15 is a wireframe of a user interface displayed to a person who has logged into the system, entered information into the response field, and selected the icon to add an external link to a response. In this example embodiment, clicking the link icon brings up another interface that contains search field and autosuggests search results. Upon clicking in the link search field, the system connects with one or a plurality of external systems that allow for the search of items within their database(s) and can return a webpage link containing the item. Under the link search field are buttons that a user can select to indicate specific link categories for the purposes of narrowing the autosuggest options to items along certain category lines, such as, but not limited to, accommodations, attractions, businesses or products. In this example embodiment, the user is narrowing the search results to attractions. Upon typing search terms, the system calls information from attraction sites providing search API's such as, but not limited to, Yelp™. As another example, the user could narrow the search results to products, which would limit system calls to products sites such as, but not limited to, Amazon™. In this case, the user types in "$18^{th}$ street" and the autosuggested search results show four options.

Figure 16:
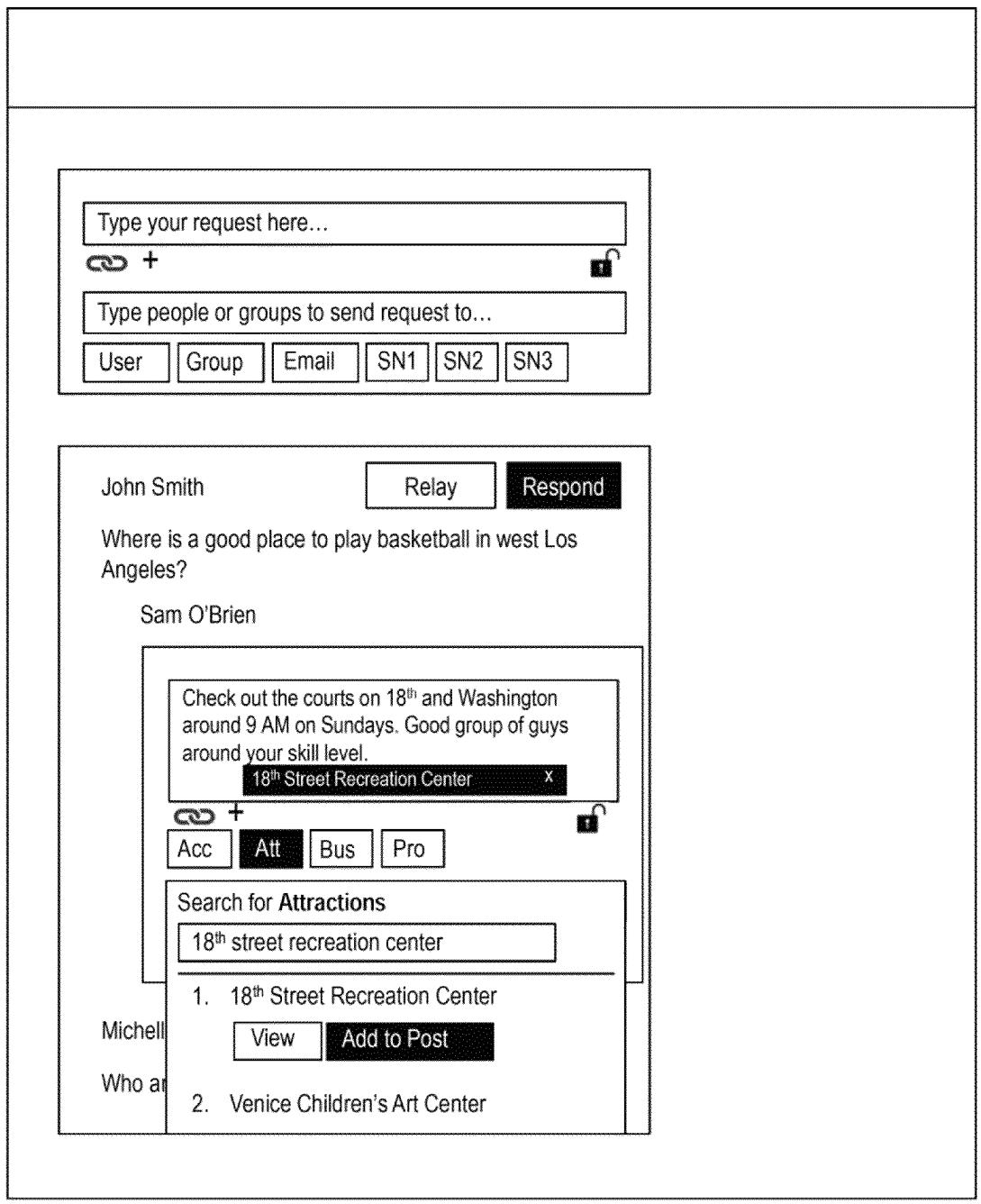

FIG. 16 is a wireframe of a user interface displayed to a person who has logged into the system, entered information into the response field, searched for an external link and selected a link to insert into the response field. In this example embodiment, the user selected the search result "$18^{th}$ street recreation center," and the system entered the result name in the search field. The system also displays a list of search results for that specific term. Each listed item gives the user the choice to view the webpage or add the link to the response (post). In this case, the user selects the "Add to Post" option, and the system appends the link below the information already in the response field.

Figure 17:
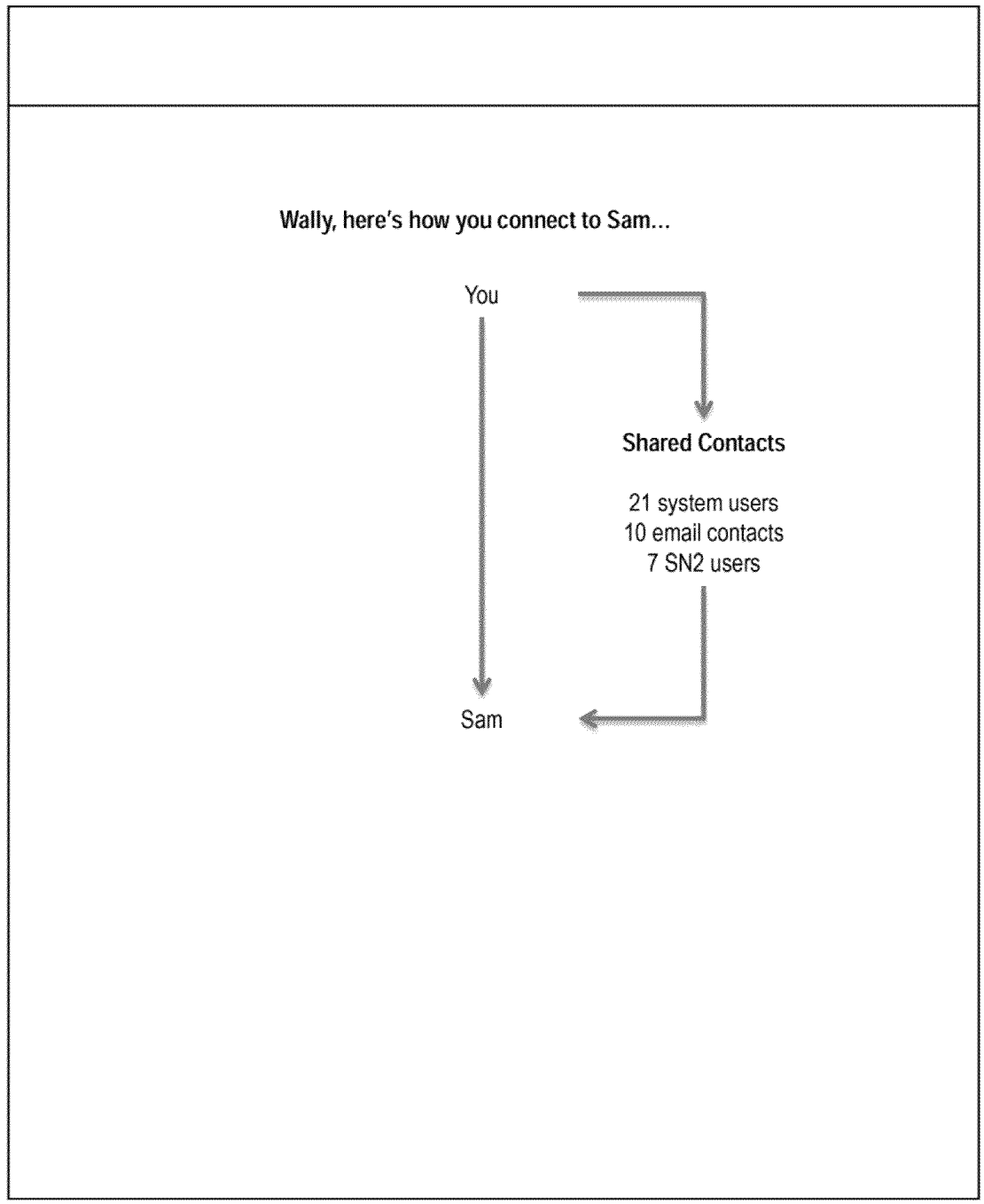

FIG. 17 is a graphic displayed (through the system user interface) to a person who elects to view shared connections with another user. This graphic diagrams how one user is connected to another user. In this case one user is Wally (referred in FIG. 17 as "Wally" or "You") and the other user is Sam. Wally elected to view how he is connected to Sam. In this example embodiment, Wally is not only connected to Sam via a direct relationship, but also they both have direct relationships with the same 21 system users, 10 email contacts and 7 contacts from an external social networking application.

Figure 18:
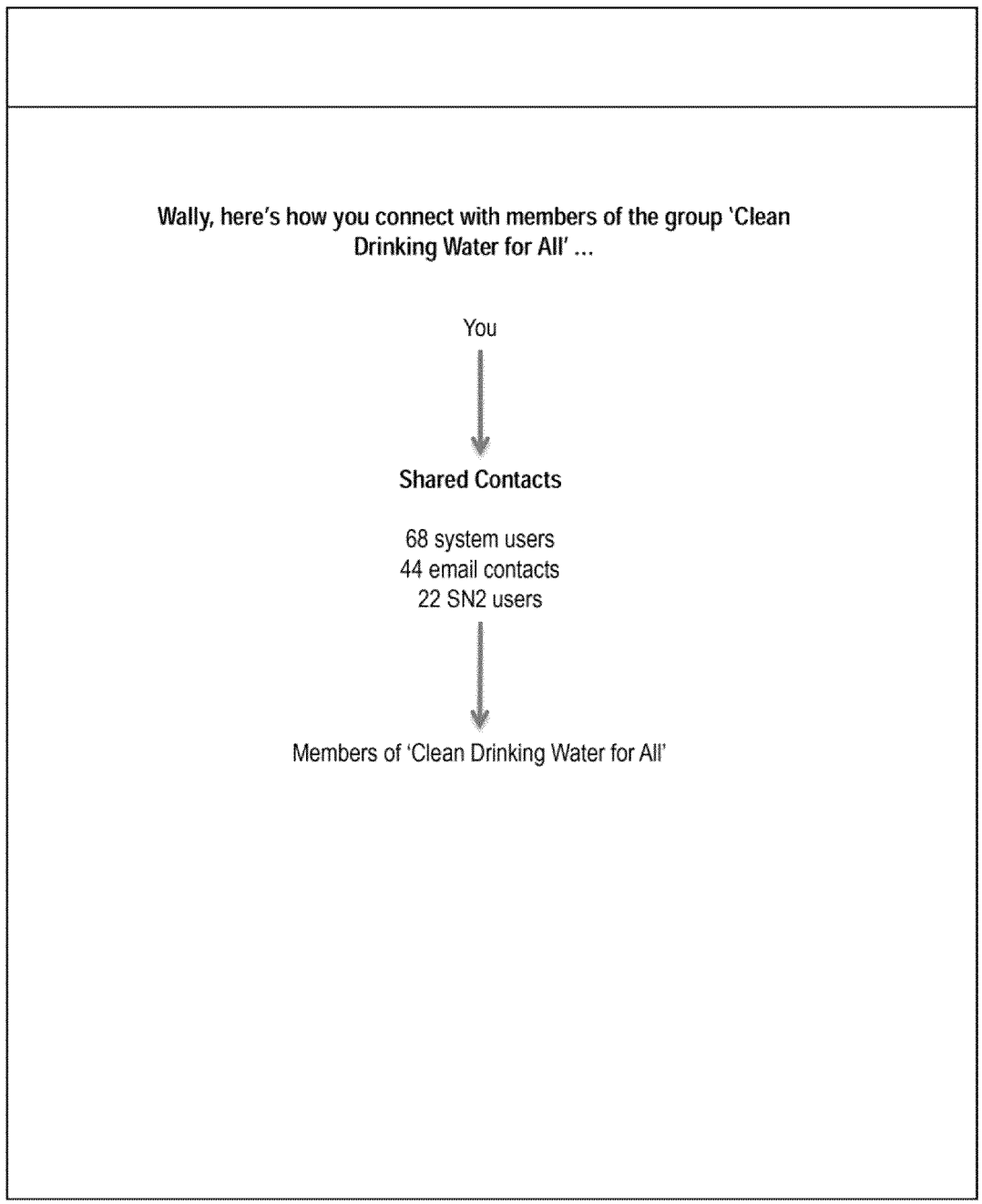

FIG. 18 is a graphic displayed (through the system user interface) to a person who elects to view shared connections with users who are a part of a particular in-system group. This graphic diagrams how one user is connected to group members. In this case one user is Wally (referred in FIG. 17 as "Wally" or "You") and the group is "Clean Drinking Water for All." Wally elected to view how he is connected to the "Clean Drinking Water for All" group members. In this example embodiment, Wally and members of the group have direct relationships with the same 68 system users, 44 email contacts and 22 contacts from an external social networking application.

FIG. 19 is a wireframe diagram of a user interface displayed to a person who has visited an external system that is using the system's request and response API. In this example embodiment, the user is Wally. Wally is visiting an external webpage about the 18$^{th}$ Street Recreation Center. The external webpage displays the number and names of system users who have reference this webpage in a request or response. Wally has clicked on the name S. O'Brien, which brings up a response written by Sam O'Brien containing a link to that webpage. Wally can better understand the context for the response and the link reference by reading the request above the response. Further, Wally can view how he is connected to the person who linked to that webpage.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A system for request and response aggregation, the system comprising:
   a plurality of processors configured to execute a request and response aggregation method;
   a system database coupled to the plurality of processors; and
   a user interface coupled to the plurality of processors and configured to communicate with system users via at least one network, wherein the request and response aggregation method comprises,
- a processor receiving a request from a system user, wherein in a system user is a member of a network of users of the system who submits requests via a system request form, and a non-system user is not a member of the network of users of the system and does not have access to the system request form, wherein in response to receiving the request via the request form, the processor receives a recipient list associated with the request, wherein the recipient lists identifies entities the system user wishes the request to be sent to;
- the processor receives a relay instruction from an entity of the recipient list, wherein the relay instruction is an instruction to transmit the request to an entity that is not on the recipient list;
- the processor relays the request;
- the processor receives a response to the request; and
- the processor aggregates the response with the corresponding request; and
- the processor receiving a message from a source external to the system, wherein the message was initiated by one of a system user and a non-system user, wherein in response to receiving the message, the processor identifies the message as one or more of a group of request types comprising a request for information, an instruction to relay a message, and a reply to an existing request for information.

2. The system of claim 1, wherein the method further comprises;
- the processor, via the user interface, displaying the request form, the request form comprising,
  - a request field in which a user can type a request;
  - a visual indication to the user that the user may attach a file to the request, wherein the visual indication includes one or more of an icon, a button, and a text link;
  - a visual indication to the user that the user may include a link in the request, wherein the visual indication includes one or more of an icon, a button, and a text link, wherein including a link comprises enabling the user to search a list for a link to include and to select a link to include;
  - a visual indication to the user that the user may include a location in the request, wherein the visual indication includes one or more of an icon, a button, and a text link, wherein including a location comprises enabling the user to search a list for a location, select a location, and insert a location name within a request;
  - a visual indication to the user that the user may lock the request, wherein the visual indication includes one or more of an icon, a button, and a text link, wherein locking the request comprises allowing the user to limit what the system may do with the request; and
  - a recipient field, wherein clicking in the recipient field enables a user to search a list for recipients, and select recipients to receive the request.

3. The system of claim 1, wherein the method further comprises:
- the processor via the user interface displaying a visual indication to the user that the user may include a link in the message, wherein the visual indication includes one or more of an icon, a button, and a text link, wherein including a link comprises adding a link to an external webpage;
- the processor via the user interface displaying a search field for various topics;
- the processor communicating with various external web page databases via one or more application programming interfaces (APIs);
- the processor receiving input from the user typed into the search field;
- the processor matching the typed input with database information received via the APIs;
- the processor via the user interface displaying a list of possible matches between the typed input and external webpages, wherein the list includes a list of links;
- the processor receiving a selection of a particular link from the user; and
- the processor inserting the selected link into a message, comprising inserting the selected link into the request field of a request message, and inserting the selected link into the response field of a response message.

4. The system of claim 1, wherein the method further comprises:
- the processor via the user interface displaying a visual indication to the user that the user may lock a message, wherein the visual indication includes one or more of an icon, a button, and a text link, and wherein the message comprises one of a request message and a response message;
- the processor detecting that a message has been locked;
- the processor allowing an unlocked message to be viewable and relayed by all system users;
- the processor allowing a locked message and any related, aggregated messages to be viewed in the system only by recipients specified by the user; and
- the processor disallowing recipients to relay locked requests beyond originator-approved recipients.

5. The system of claim 1, wherein the method further comprises:
- the processor via the user interface displaying a recipients field of the request, into which the user can type recipient names;
- the processor connecting to system and non-system contacts databases accessible to the user, wherein the databases include one or more of social networking application databases, email clients databases, and phone contact databases;
- the processor determining which contacts are available via system and non-system databases;
- the processor via the user interface displaying available contacts to the user;
- the processor matching partially and fully typed contacts to full system and non-system contact lists;
- the processor via the user interface displaying available and matching contacts to the user;
- the processor receiving instructions from the user to add a contact to a recipient list; and
- the processor sending the request to the recipients on the recipient list, wherein the recipients include system users and non-system users.

6. The system of claim 1 further comprising:
- the processor sending a request to a recipient list specified by the user, wherein the user is a system user and the recipient list includes system users and non-system users, and wherein the recipient list includes one or more of social networking contacts of the user, email contacts of the user, and text application contacts of the user; and
- the processor relaying a request to a recipient list specified by the user, wherein the user is a system user and the recipient list includes system users and non-system users, and wherein the recipient list includes one or more of social networking contacts of the user, email contacts of the user, and text application contacts of the user.

7. The system of claim 1, wherein the method further comprises:
the processor via the user interface displaying a visual indication to the user that the user may relay a request to one or more recipients, wherein the visual indication includes one or more of an icon, a button, and a text link;
the processor via the user interface displaying a recipient field;
the processor via the user interface displaying a search field for various contacts;
the processor communicating with a system contact database;
the processor communicating with non-system contact databases via APIs;
the processor creating a list of available contacts;
the processor receiving input from user typed into the search field;
the processor matching the typed input with elements of the list of available contacts;
the processor via the user interface displaying a list of matches between the input from the user and the list of available contacts;
the processor receiving a selection of a contact from the user;
the processor inserting the selected contact into the recipient list; and
the processor relaying the request to one or more recipients listed in the recipient field.

8. The system of claim 1, wherein the method further comprises:
the processor routing messages to users, groups and contacts indicated by the user;
the processor routing message to system users via a system database; and
the processor routing messages to non-system users via one or more of APIs, email messages, and text messages.

9. The system of claim 1, wherein the method further comprises:
the processor displaying to the user via the user interface a plurality of requests previously submitted by the user and a plurality of requests previously submitted by other system users;
the processor displaying to the user via the user interface a plurality of responses to requests previously submitted by the user and by other system users;
the processor displaying to the user via the user interface a list of recipients for requests previously submitted by the user and by other system users; and
the processor displaying to the user via the user interface a list of relay recipients in chronological order for responses previously submitted by other system users.

10. A system for request and response relay and aggregation, the system comprising:
a plurality of processors configured to execute a request and response relay and aggregation method;
a system database coupled to the plurality of processors; and
a user interface coupled to the plurality of processors and configured to communicate with system users via at least one network, wherein the request and response relay and aggregation method comprises,
a processor receiving input from the user interface from a system user wishing to submit a request, wherein in a system user is a member of a network of users of the system;
the processor displaying a request menu to the user, wherein the request menu includes:
a user name preceded by a special system character, wherein the special system character identifies the user as a system user;
a plurality of shorthand command icons that allow the user to indicate commands, the shorthand commands comprising a photo command, a relay command, a lock command, and one or more non-system social network commands;
the processor identifying the input as one or more of a group of request types comprising a request for information, an instruction to relay a message, and a reply to an existing request for information;
the processor determining whether the input comprises an original request or contains an existing request identification (ID);
if the message comprises an original request, the processor creating a unique request ID and associating the original request with the ID;
if the message contains an existing request ID, aggregating the message with all other messages containing the same request ID; and
storing all messages in the database associated with their respective request IDs.

11. The system of claim 10, wherein the method further comprises;
the processor receiving a typed request via the request menu;
the processor receiving a typed list of recipients via the request menus;
the processor receiving any shorthand commands chosen by the user; and
the processor transmitting the request to the recipients and executing the chosen shorthand commands, wherein a relay command indicates that the request can be relayed by recipients, a photo command allows the user to upload photos to the request, a lock command indicates that recipients cannot relay the request unless the originator provides subsequent approval, a non-system social network command followed by a user name for a non-system social network indicates that the request is also to be transmitted to the named user via the non-system social network.

12. The system of claim 11, wherein the method further comprises:
the processor via the user interface receiving input from the user comprising a response to the request;
the processor displaying the response with any other responses to the same request;
the processor associating the response with a unique ID created for the original request; and
the processor storing the response, any other responses, and the original request in the database associated with the unique ID of the original request.

13. A computer-implemented method for managing communications among users of a request and response aggregation system, the method comprising:
a processor receiving a request from a system user, wherein in a system user is a member of a network of users of the system, and a non-system user is not a member of the network of users of the system;

the processor receiving a recipient list associated with the request, wherein the recipient lists identifies entities the system user wishes the request to be sent to;

the processor receiving a relay instruction from an entity of the recipient list, wherein the relay instruction is an instruction to transmit the request to an entity that is not on the recipient list;

the processor relaying the request;

the processor receiving a response to the request from a response writer;

the processor aggregating the response with the corresponding request;

the processor storing the aggregated response and corresponding request along with an associated URL reference, a user ID, and a relationship of the user to the response writer; and the processor displaying to the user via the user interface a graphical representation of any relationship between the user and another user or group, wherein relationship includes multiple intermediate relationships between the user and the other user or group, and wherein relationship further includes relationship within the system and within other connected systems, other connected systems comprising one social networking systems, phone systems, and email application systems.

14. The method of claim 13, further comprising:

the processor receiving a message from a source external to the system, wherein the message was initiated by one of a system user and a non-system user; and the processor identifying the message as one or more of a group of request types comprising a request for information, an instruction to relay a message, and a reply to an existing request for information.

15. The method of claim 13, further comprising;

the processor, via a user interface, displaying a request form, the request form comprising,
  a request field in which a user can type a request;
  a visual indication to the user that the user may attach a file to the request, wherein the visual indication includes one or more of an icon, a button, and a text link;
  a visual indication to the user that the user may include a link in the request, wherein the visual indication includes one or more of an icon, a button, and a text link, wherein including a link comprises enabling the user to search a list for a link to include and to select a link to include;
  a visual indication to the user that the user may include a location in the request, wherein the visual indication includes one or more of an icon, a button, and a text link, wherein including a location comprises enabling the user to search a list for a location, select a location, and insert a location name within a request;
  a visual indication to the user that the user may lock the request, wherein the visual indication includes one or more of an icon, a button, and a text link, wherein locking the request comprises allowing the user to limit what the system may do with the request; and
  a recipient field, wherein clicking in the recipient field enables a user to search a list for recipients, and select recipients to receive the request.

16. The method of claim 15, further comprising:

the processor receiving a request, with attachments, locations and links, from the user;

the processor receiving instructions for how to relay and display restrictions;

the processor receiving the list of recipients identified by the user; and the processor routing the request to system user recipients and non-system user recipients.

17. The method of claim 13, further comprising:

the processor via the user interface displaying a visual indication to the user that the user may include a link in the message, wherein the visual indication includes one or more of an icon, a button, and a text link, wherein including a link comprises adding a link to an external webpage;

the processor via the user interface displaying a search field for various topics;

the processor communicating with various external web page databases via one or more application programming interfaces (APIs);

the processor receiving input from the user typed into the search field;

the processor matching the typed input with database information received via the APIs;

the processor via the user interface displaying a list of possible matches between the typed input and external webpages, wherein the list includes a list of links;

the processor receiving a selection of a particular link from the user; and the processor inserting the selected link into a message, comprising inserting the selected link into the request field of a request message, and inserting the selected link into the response field of a response message.

18. The method of claim 13, further comprising:

the processor via the user interface displaying a visual indication to the user that the user may lock a message, wherein the visual indication includes one or more of an icon, a button, and a text link, and wherein the message comprises one of a request message and a response message;

the processor detecting that a message has been locked;

the processor allowing an unlocked message to be viewable and relayed by all system users;

the processor allowing a locked message and any related, aggregated messages to be viewed in the system only by recipients specified by the user; and the processor disallowing recipients to relay locked requests beyond originator-approved recipients.

19. The method of claim 13, further comprising:

the processor via the user interface displaying a recipients field of the request, into which the user can type recipient names;

the processor connecting to system and non-system contacts databases accessible to the user, wherein the databases include one or more of social networking application databases, email clients databases, and phone contact databases;

the processor determining which contacts are available via system and non-system databases;

the processor via the user interface displaying available contacts to the user;

the processor matching partially and fully typed contacts to full system and non-system contact lists;

the processor via the user interface displaying available and matching contacts to the user;

the processor receiving instructions from the user to add a contact to a recipient list; and the processor sending the request to the recipients on the recipient list, wherein the recipients include system users and non-system users.

20. The method of claim 19, further comprising:
the processor via the user interface displaying a create group form allowing users to create a group;
the processor via the user interface displaying a settings page for a group allowing a group administrator to edit group information, group members, and a group type;
the processor receiving instruction about the type of group, wherein the type of group controls,
whether anyone can join the group, or whether members have to be accepted by a group administrator; and
whether anyone or only group members can find the group, send requests to the group, view requests sent to the group, and view responses by group members to requests sent to the group.

21. The method of claim 19, further comprising:
the processor determining which system users are accessible to the user;
the processor determining which system groups are accessible to the user;
the processor determining which non-system contacts are accessible to the user; and
the processor determining which users, groups and contacts match characters typed by user.

22. The method of claim 19, further comprising:
the processor sending a request to a recipient list specified by the user, wherein the user is a system user and the recipient list includes system users and non-system users, and wherein the recipient list includes one or more of social networking contacts of the user, email contacts of the user, and text application contacts of the user; and
the processor relaying a request to a recipient list specified by the user, wherein the user is a system user and the recipient list includes system users and non-system users, and wherein the recipient list includes one or more of social networking contacts of the user, email contacts of the user, and text application contacts of the user.

23. The method of claim 13, further comprising:
the processor receiving a message from an external system;
the processor identifying the message as one or more message types comprising a request for a response, an instruction to relay a request, and a response to an existing request;
the processor determining whether the message comprises an original request or contains an existing request identification (ID);
if the message contains an existing request ID, the processor aggregating the message as a response with all other responses tied to the same request ID;
if the message contains an existing request ID and a recipient ID coupled with a relay shorthand command, the processor sending the original request to the identified recipient and aggregating the relay instructions with all other relay instructions tied to the same request ID;
if the message contains a user ID and does not contain an existing request ID, the processor creating a unique request ID and storing the message as an original request with the ID;
if the message contains a user ID and does not contain an existing request ID and contains a recipient ID coupled with a relay shorthand command, the processor creating a unique request ID and storing the message as an original request with the ID and the processor sending the original request to the identified recipient and aggregating the relay instructions with all other relay instructions tied to the same request ID.

24. The method of claim 13, further comprising:
the processor via the user interface displaying a visual indication to the user that the user may relay a request to one or more recipients, wherein the visual indication includes one or more of an icon, a button, and a text link;
the processor via the user interface displaying a recipient field;
the processor via the user interface displaying a search field for various contacts;
the processor communicating with a system contact database;
the processor communicating with non-system contact databases via APIs;
the processor creating a list of available contacts;
the processor receiving input from user typed into the search field;
the processor matching the typed input with elements of the list of available contacts;
the processor via the user interface displaying a list of matches between the input from the user and the list of available contacts;
the processor receiving a selection of a contact from the user;
the processor inserting the selected contact into the recipient list; and
the processor relaying the request to one or more recipients listed in the recipient field.

25. The method of claim 13, further comprising:
the processor routing messages to users, groups and contacts indicated by the user;
the processor routing message to system users via a system database; and
the processor routing messages to non-system users via one or more of APIs, email messages, and text messages.

26. The method of claim 13, further comprising:
the processor displaying to the user via the user interface a plurality of requests previously submitted by the user and a plurality of requests previously submitted by other system users;
the processor displaying to the user via the user interface a plurality of responses to requests previously submitted by the user and by other system users;
the processor displaying to the user via the user interface a list of recipients for requests previously submitted by the user and by other system users; and
the processor displaying to the user via the user interface a list of relay recipients in chronological order for responses previously submitted by other system users.

27. The method of claim 13, further comprising:
the processor receiving a request for information from an external website, including a uniform resource locator (URL) and a system user ID;
the processor searching the system database for records containing the URL; and
the processor transmitting records that contain the URL to the external website with the URL reference, associated requests, and a description of the relationship between the record writers and the external website user.

* * * * *